US010985551B2

(12) United States Patent
Götz

(10) Patent No.: US 10,985,551 B2
(45) Date of Patent: Apr. 20, 2021

(54) DOUBLE FUSING OF THE MODULE STORE INTERFACE

(71) Applicant: Dr. Ing. h.c. F. Porsche Aktiengesellschaft, Stuttgart (DE)

(72) Inventor: Stefan Götz, Forstern (DE)

(73) Assignee: Dr. Ing. h.c. F. Porsche Aktiengesellschaft

(*) Notice: Subject to any disclaimer, the term of this patent is extended or adjusted under 35 U.S.C. 154(b) by 287 days.

(21) Appl. No.: 16/295,342

(22) Filed: Mar. 7, 2019

(65) Prior Publication Data

US 2019/0288504 A1 Sep. 19, 2019

(30) Foreign Application Priority Data

Mar. 16, 2018 (DE) ..................... 10 2018 106 162.5

(51) Int. Cl.

*H02H 7/18* (2006.01)
*H02M 3/156* (2006.01)
*H02J 7/00* (2006.01)
*H02M 7/483* (2007.01)

(52) U.S. Cl.

CPC ............. *H02H 7/18* (2013.01); *H02J 7/0026* (2013.01); *H02M 3/156* (2013.01); *H02M 7/483* (2013.01)

(58) Field of Classification Search

None

See application file for complete search history.

(56) References Cited

U.S. PATENT DOCUMENTS

| | | | |
|---|---|---|---|
| 7,269,037 | B2 | 9/2007 | Marquardt |
| 8,970,144 | B2 | 3/2015 | Fink |
| 2018/0013339 | A1 | 1/2018 | Götz |

FOREIGN PATENT DOCUMENTS

| | | | |
|---|---|---|---|
| DE | 10217889 | A1 | 11/2003 |
| DE | 102011014133 | A1 | 9/2012 |
| DE | 102012210910 | A1 | 1/2014 |
| DE | 102016112250 | A1 | 1/2018 |

OTHER PUBLICATIONS

Yang, S., et al., “A novel distributed control strategy for modular multilevel converters,” 2017, pp. 3234-3240, 2017 IEEE Applied Power Electronics Conference and Exposition (APEC), Tampa, FL, doi: 10.1109/APEC.2017.7931160.

*Primary Examiner* — Sarah A. Slifka
(74) *Attorney, Agent, or Firm* — RatnerPrestia

(57) ABSTRACT

A circuit for protecting energy storage cells in which at least one energy storage cell is part of an AC battery having at least one module. The at least one module includes at least one half-bridge having two power semiconductor switches, a module storage element and a module controller. The at least one module is connected to the at least one energy storage cell to form a first connection and the first connection between the at least one module and the at least one energy storage cell has a first fuse that can interrupt the first connection. The circuit has a second connection between the module controller of the at least one module and the at least one energy storage cell.

12 Claims, 4 Drawing Sheets

100 101 102 111 106 106 106 106 108 104 103 105 110 109 106 106 106 106 107 120

DOUBLE FUSING OF THE MODULE STORE INTERFACE

CROSS-REFERENCE TO RELATED APPLICATION

This application claims priority to German Patent Application No. DE 10 2018 106 162.5, filed Mar. 16, 2018, which is incorporated by reference herein in its entirety.

FIELD OF THE INVENTION

The present invention relates to a circuit for protecting individual energy storage cells of an AC battery that is dynamically reconfigured in an internal interconnection in order to supply power to an AC load.

BACKGROUND OF THE INVENTION

Battery packs at present that are used for an electric vehicle are hardwired units comprising individual parts, for example battery cells. At the output, such battery packs deliver almost exclusively DC voltage. Most loads, on the other hand, require an AC voltage having a harmonic voltage profile of determined frequency, amplitude and phase, for example.

Dynamic reconfiguration of the battery interconnection allows the AC voltage or a polyphase voltage to be produced for one or more loads directly. As such, by way of example, the document DE 10 2011 014 133 A1, which is incorporated by reference herein, proposes dynamic reconfiguration of a battery by connecting individual battery modules to produce the change in an output voltage.

If just one part of a battery is defective, for example a battery cell, the whole battery pack is normally unusable. In the case of an electric vehicle, total failure must then be expected. If need be, a shutdown must even be actively enforced so that a faulty battery part does not overheat and catch fire when put under further load. In this context, the document DE 10 2012 210 910 A1, which is incorporated by reference herein, discloses monitoring of individual battery modules. When a fault occurs, the faulty battery module is bypassed.

Power electronics with power semiconductor switches, such as, for example, a modular multilevel converter, abbreviated to MMC and described in DE 102 17 889 A1, which is incorporated by reference herein, for example, can be used to split otherwise hardwired battery packs into multiple modular battery parts whose electric interconnection can be dynamically changed during operation. A modular battery part can consist of individual battery cells, but also of multiple battery cells that themselves again form a small battery pack. In this case, dynamic reconfiguration allows defective battery cells to be bypassed or any output voltages to be produced.

In the case of modular multilevel converters, known to a person skilled in the art in abbreviations MMC, MMSPC and others, it is tempting to use energy storage cells, which need protection. This relates in particular to battery cells, batteries and double-layer capacitors in order to construct AC batteries. For this reason, energy storage cells of this kind are for the most part connected to a respective module of the modular multilevel converter with a fuse, for example a fusible link and/or a contactor, in order to prevent damage to the batteries or fires. In particular, this is done together with an overcurrent or undervoltage cutoff, tripping of which also trips the contactor as well. Such cases can arise, by way of example, in the event of damage to the power semiconductor switches, for example failure of the semiconductor and hence shorting of the connected batteries. At the same time, a respective module controller in such systems is for the most part very smartly supplied with power from a respective local module storage element, for example a capacitor. As a result, small DC isolated DC voltage transformers can be avoided, because the module storage elements can provide a supply voltage at an electrical potential of the module or relative thereto. It should be borne in mind in this case that the local electrical potential, as it were the "local ground", moves in relation to the earth depending on the module state. If the local module controller and module monitoring are now supplied with power from the energy storage cell and the fuse is tripped, however, the module controller and module monitoring therefore also lose their supply voltage and fail. This is moreover just at a time at which the battery module requires a module controller and module monitoring.

SUMMARY OF THE INVENTION

Against this background, described herein is a circuit that protects a respective energy storage cell in an AC battery constructed from modules, the respective modules requiring both a module controller and module monitoring during operation.

In a circuit for protecting energy storage cells, in which at least one energy storage cell is part of an AC battery, the AC battery has at least one module and the at least one module comprises at least one half-bridge comprising two power semiconductor switches, a module storage element and a module controller, characterized in that the at least one module is connected to the at least one energy storage cell to form a first connection and the first connection between the at least one module and the at least one energy storage cell has a first fuse that can interrupt the first connection, the circuit having a second connection between the module controller of the at least one module and the at least one energy storage cell.

Normally, the circuit comprises multiple modules and multiple energy storage cells, a respective module being connected to a respective energy storage cell via a respective first connection and the respective first connection between the respective module and the respective energy storage cell having a respective first fuse that can interrupt the respective first connection. Further, the circuit has a respective second connection between a respective module controller of a respective module and the respective energy storage cell. This means that each module is connected to a respective energy storage cell. In a refinement, each module has a uniquely associated energy storage cell to which the respective module is connected.

Thus, in comparison with the prior art, the module controller is no longer supplied with electric power via the first connection of the module to the energy storage cell. Therefore, an interruption to the first connection between the energy storage cell to be protected and a power section comprising the power semiconductor switches of the module no longer automatically influences operation of the module controller.

If the first fuse of the power section is tripped, for example in order to prevent an overload or thermal runaway of the energy storage cell, the module controller, the supply of power to which continues to be ensured from the energy storage cell, can continue to control the power section.

In one refinement of the circuit according to aspects of the invention, the second connection between the module controller and the energy storage cell has a second fuse. This may be a fusible link or a resettable fuse, for example. The resettable fuse may be a thermal release, for example. When a second fuse is used, trip limits of the first and second fuses can differ distinctly. Depending on use, for example in an electric vehicle, the first fuse, responsible for the power section, may be at several 100 A or, in a network storage element, at at least several 10s of A. By contrast, the second fuse, responsible for the module controller, may be at from several 100 mA to a few amps, on the other hand.

In a further refinement of the circuit according to aspects of the invention, the first connection between the at least one or the respective module and the at least one or the respective energy storage cell additionally has a contactor.

In yet a further refinement of the circuit according to aspects of the invention, the second connection between the module controller of the at least one module and the at least one energy storage cell has an additional quiescent circuit. The quiescent circuit may advantageously be embodied as a semiconductor switch, for example a field effect transistor. A quiescent circuit of this kind prevents emptying of the respective energy storage cell as a result of a quiescent current during nonoperation by interrupting the supply of power. It can be actuated by a central controller, for example, which can thus “wake” modules from a quiescent state.

In a further refinement of the circuit according to aspects of the invention still, the quiescent circuit is a switch that is DC isolated from the circuit. Said switch may be embodied as an optocoupler or an optotransistor or phototransistor, for example. The optocoupler is actuated from “outside” and hence in DC isolated fashion, for example via a common waking line of the superordinate controller, which can thereby act without taking into consideration the potential conditions present in the respective module. The respective optocoupler can alternatively be actuated using dedicated waking lines for a respective module or a subgroup of modules.

In a further refinement of the circuit according to aspects of the invention, the second connection between the module controller of the at least one module and the at least one energy storage cell additionally has a DC voltage transformer. The DC voltage transformer may be embodied as a buck converter, a boost converter or a buck/boost converter, for example. In this manner, a voltage of the energy storage cell can be matched to a need of the module controller and/or if need be a large voltage fluctuation can be compensated for. Specifically batteries can have large voltage differences of more than 50% depending on a state of charge and a load current.

In a further refinement of the circuit according to aspects of the invention, the module controller of the at least one module is configured to additionally also bring about module monitoring that monitors the power semiconductor switches or the power section.

In yet a further refinement of the circuit according to aspects of the invention, the module controller of the at least one module is configured to monitor opening of the first fuse. Unlike in the prior art, the module controller can undertake this without any problem, since according to aspects of the invention the supply of power to the module controller is independent of the first connection.

In a further refinement of the circuit according to aspects of the invention still, the module controller of the at least one module is configured to detect opening of the first fuse by means of test points upstream and downstream of the first fuse. By way of example, test contacts arranged in such a manner can be used to impress a test current, e.g. having a constant current intensity of a few milliamps, or preferably a square-wave signal at a predetermined frequency and preferably between two predetermined current values not equal to zero on the basis of better and less noise-prone detection, and the test current can be remeasured. If the test current no longer flows or now flows only capacitively, an open connection can be assumed. If the first fuse has a contactor, for example a contactor with electronic overcurrent opening, arranged downstream of it, the detection can be effected by read-back or changeover contacts. Additionally, test points can be used at a contact of the energy storage cell, for example at a positive pole of the energy storage cell, and a contact for the power section, for example for the module storage element. If these test lines are connected to the battery and the power circuit independently of the power terminals, for example using independent screw points or soldered joints, it is possible to detect not only the open first fuse but also mechanical breaking of the first connection. It is advantageous for positioning of the respective test point, but also of the terminal of the second connection to the module controller, if the two are screwed or welded particularly close to a contact lug or contact pad protruding from the energy storage cell. If need be, the respective test point end the terminal of the second connection are positioned separately. The terminal of the first connection to the power section is usually screwed or welded directly to the energy storage cell. There may also be connection holes provided on the energy storage cell for the respective terminals.

Finally, in one refinement of the circuit according to aspects of the invention, an additional capacitor may be arranged downstream of the first fuse and the optional contactor and upstream of the power section. As soon as the first fuse of the power section trips and the energy storage cell is isolated from the power semiconductor switches during operation, the power section no longer has a supply of power available. If power has just been delivered or drawn in operation during the failure, however, the module threatens to drain or fill up, which means that a voltage across the power semiconductor switches falls or rises. The capacitor arranged according to aspects of the invention provides a capacitance of the capacitor for operating the power section when the actual supply of power by the energy storage cell is decoupled. By contrast, the supply of power to the controller is already ensured according to aspects of the invention by the second connection to the energy storage cell.

Should the supply of power to the module controller fail despite the dedicated second connection to the energy storage cell, this should be able to be detected by a superordinate controller. By way of example, this can be effected by virtue of the module controller needing to report its readiness to the superordinate controller during continued execution. If this report is absent, the superordinate controller must assume that the module controller has failed or is no longer supplied with power. By way of example, the readiness can be implemented by a signal that actively needs to be set to high and that is otherwise pulled to 0 by a pull-down resistor, for example by what is known as an open-collector bus. Alternatively, a particular bit pattern can be used on a line, said bit pattern needing to follow particular rules. These rules can relate to amplitude and frequency, for example, or can call for a fixed bit pattern or a bit pattern changing on the basis of predictable rules, for example from a shift register circuit, as known from encryption technology. Similarly, a packetbased communication can also be effected via a bus, with a regular status packet needing to be sent. If said status pocket is absent, a case referred to as "timeout", failure of the module controller can be expected. In this instance, however, there is the disadvantage that it is necessary to work with a bus overhead and similarly to assume a timeout time, and hence there may be a high reaction time.

Further advantages and refinements of the invention emerge from the description and the accompanying drawing.

It goes without saying that the features cited above and those yet to be explained below can be used not only in the respectively indicated combination but also in other combinations or on their own without departing from the scope of the present invention.

BRIEF DESCRIPTION OF THE DRAWING

The figures are described coherently and comprehensively, with identical components having the same associated reference signs.

DETAILED DESCRIPTION OF THE INVENTION

Figure 1:
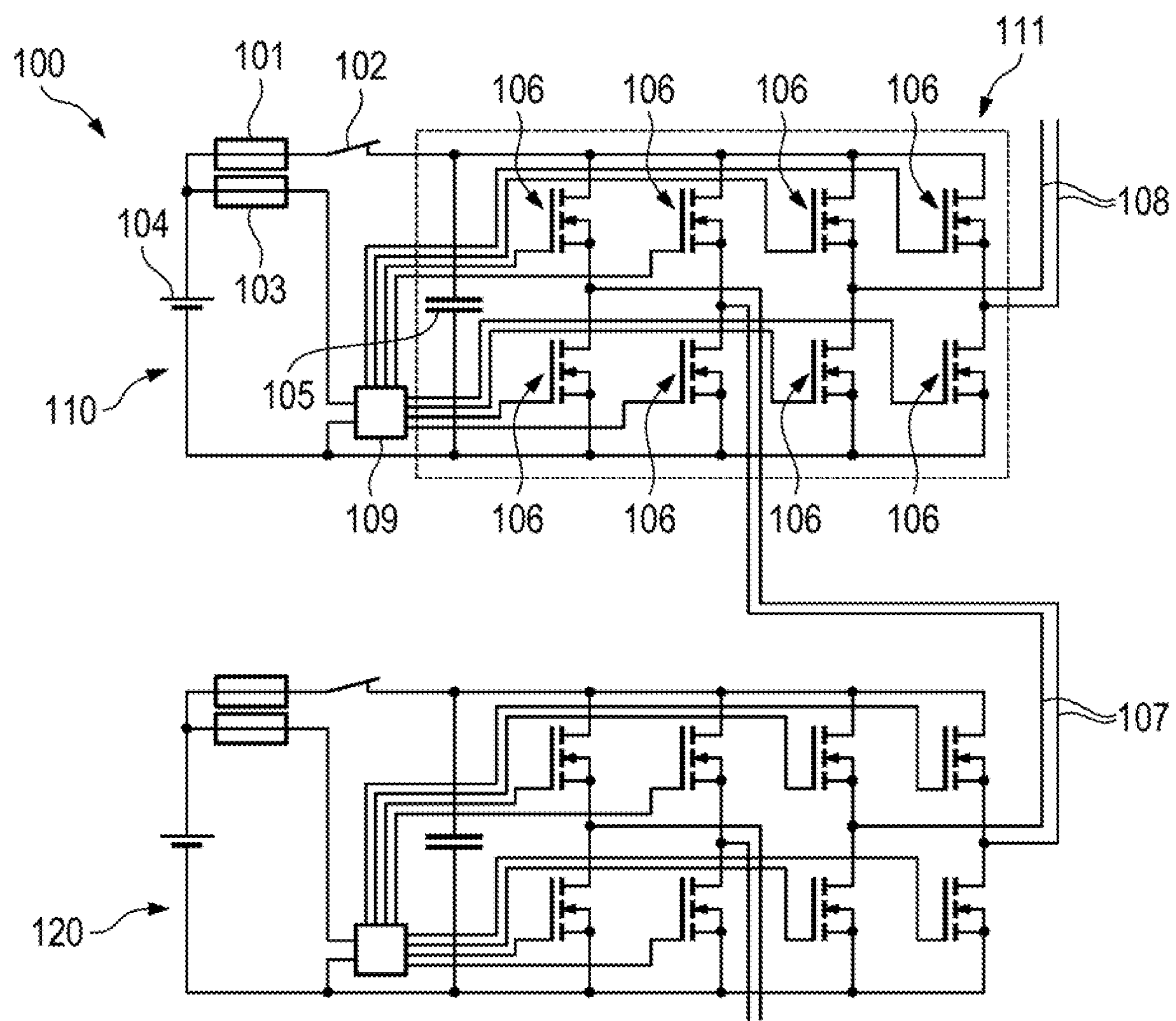
FIG. 1 shows an embodiment of the circuit according to aspects of the invention using two interconnected modules.

FIG. 1 shows a circuit 100 according to aspects of the invention using two modules 110 and 120 connected to one another via connecting lines 107, the circuit being described by way of example using module 110. The module 110 is supplied with power via an energy storage cell 104. To this end, a first connection is arranged from the energy storage cell 104 to a power section 111 of the module 110, which power section comprises a plurality of power semiconductor switches 106 and a module storage element 105. This connection is protected by a first fuse 101. Optionally, it is additionally possible, as shown here, for a contactor 102 to be arranged. The power semiconductor switches 106 are controlled by a module controller 109. So that the module controller 109 can continue to control the power semiconductor switches 106 or to perform a conceivable monitoring function even after an interruption to the first connection, optionally as a result of the fuse 101 or the optional contactor 102 being opened, the module controller 109 or the module 110 has, according to aspects of the invention, a supply of power independent of the first connection. This is formed by means of a second connection from the energy storage cell 104 to the module controller 109 that can be interrupted by the fuse 103. The module 110 is further connected to the next module or to the output of an AC battery via connecting lines 108.

Figure 2:
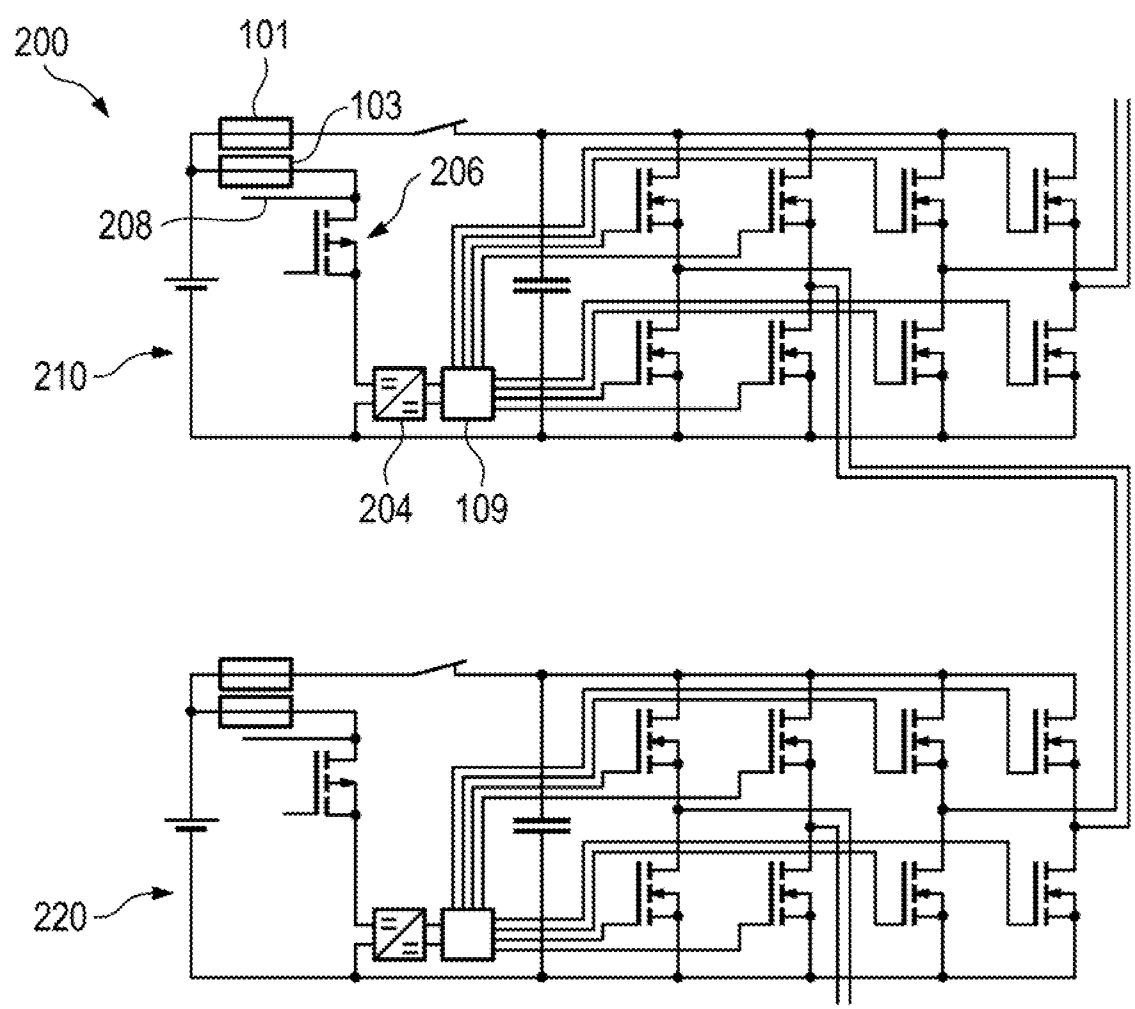
FIG. 2 shows a further embodiment of the circuit according to aspects of the invention with a quiescent cutoff and a voltage transformer.

FIG. 2 shows a circuit 200 according to aspects of the invention having a quiescent cutoff 206 and a voltage transformer 204, the two each on their own being able to be regarded as optional. As in FIG. 1, two interconnected modules 210 and 220 are depicted that each have an identical design to the modules shown in FIG. 1, for example with the first fuse 101, the second fuse 103 and the module controller 109. However, the circuit has been expanded in comparison with FIG. 1 firstly with a quiescent circuit 206, which can be used to interrupt and restore a supply of power to the module controller 109. Several electronic components are possible for a switch for the quiescent circuit 206, said switch represented in this case by an enhancement-type p-channel field effect transistor. A superordinate controller has a connection 208 to a drain terminal of the field effect transistor of the quiescent circuit 206 and uses this connection 208 to control a switching behavior of the quiescent circuit 206. Secondly, a DC voltage transformer 204 by means of which the module controller 109 is connected to the energy storage cell is shown in the circuit 200 for the module 210.

Figure 3:
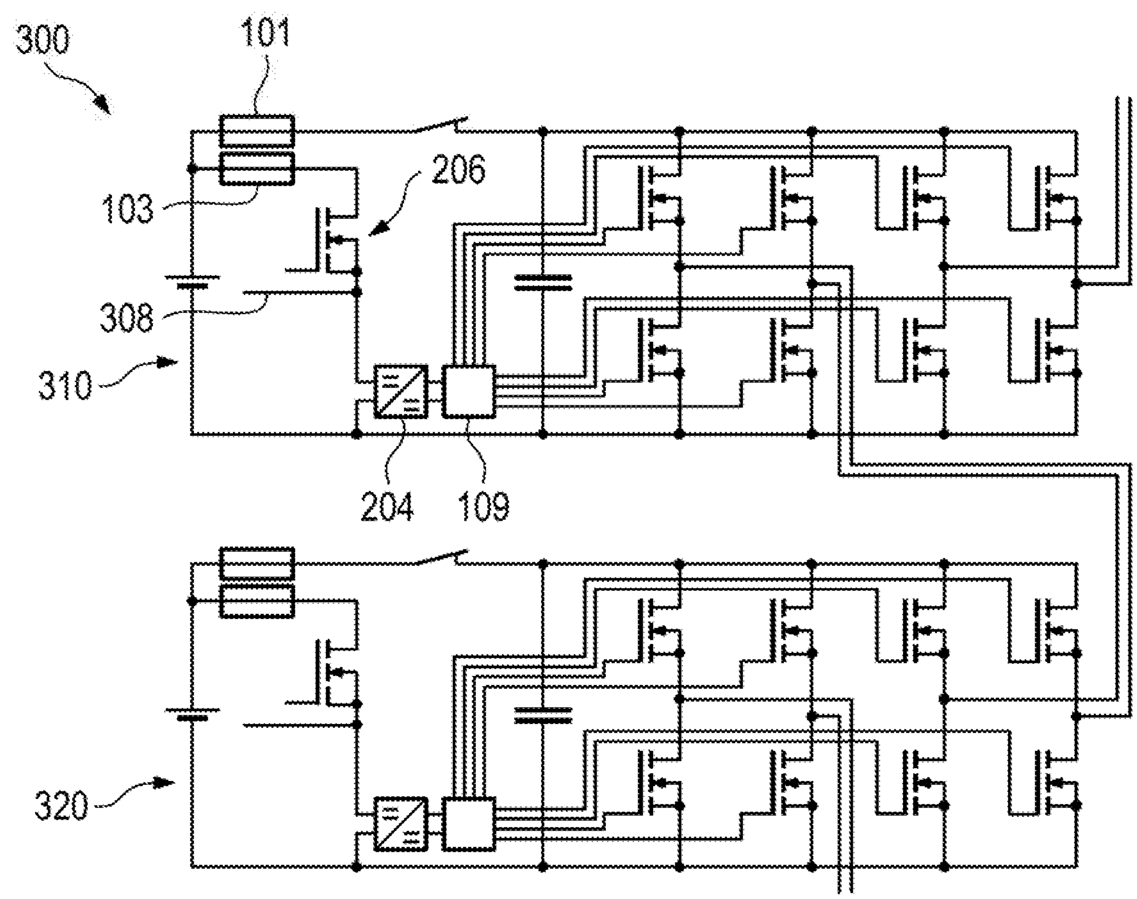
FIG. 3 shows another embodiment of the circuit according to aspects of the invention with a further quiescent cutoff and a voltage transformer.

FIG. 3 shows a circuit 300 according to aspects of the invention having a further quiescent cutoff 206 and a voltage transformer 204. This is almost the same circuit as in FIG. 2, but the connection 308 of the superordinate controller is now at a source terminal of the field effect transistor of the quiescent circuit 206.

Figure 4:
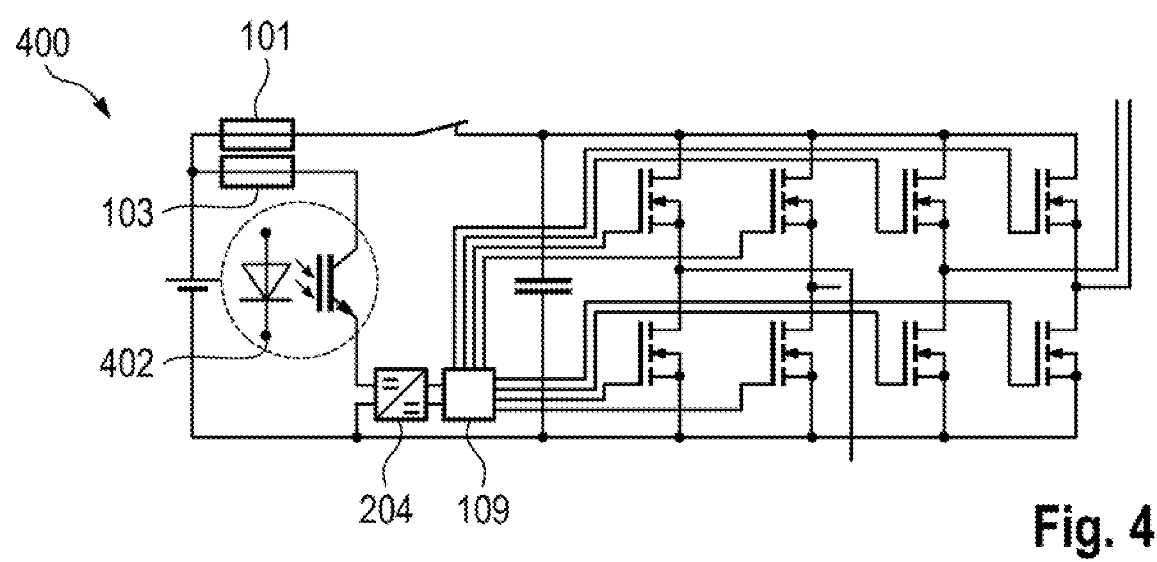
FIG. 4 shows yet a further embodiment of the circuit according to aspects of the invention with an optocoupler.

FIG. 4 shows a circuit 400 according to aspects of the invention having an optocoupler 402. While the first fuse 101 protects the energy cell from the power section, there is an optocoupler 402 in the second connection between the module controller 109 with the upstream DC voltage transformer 204 and the second fuse 103. The optocoupler 402 allows a quiescent circuit DC isolated from the module.

Figure 5:
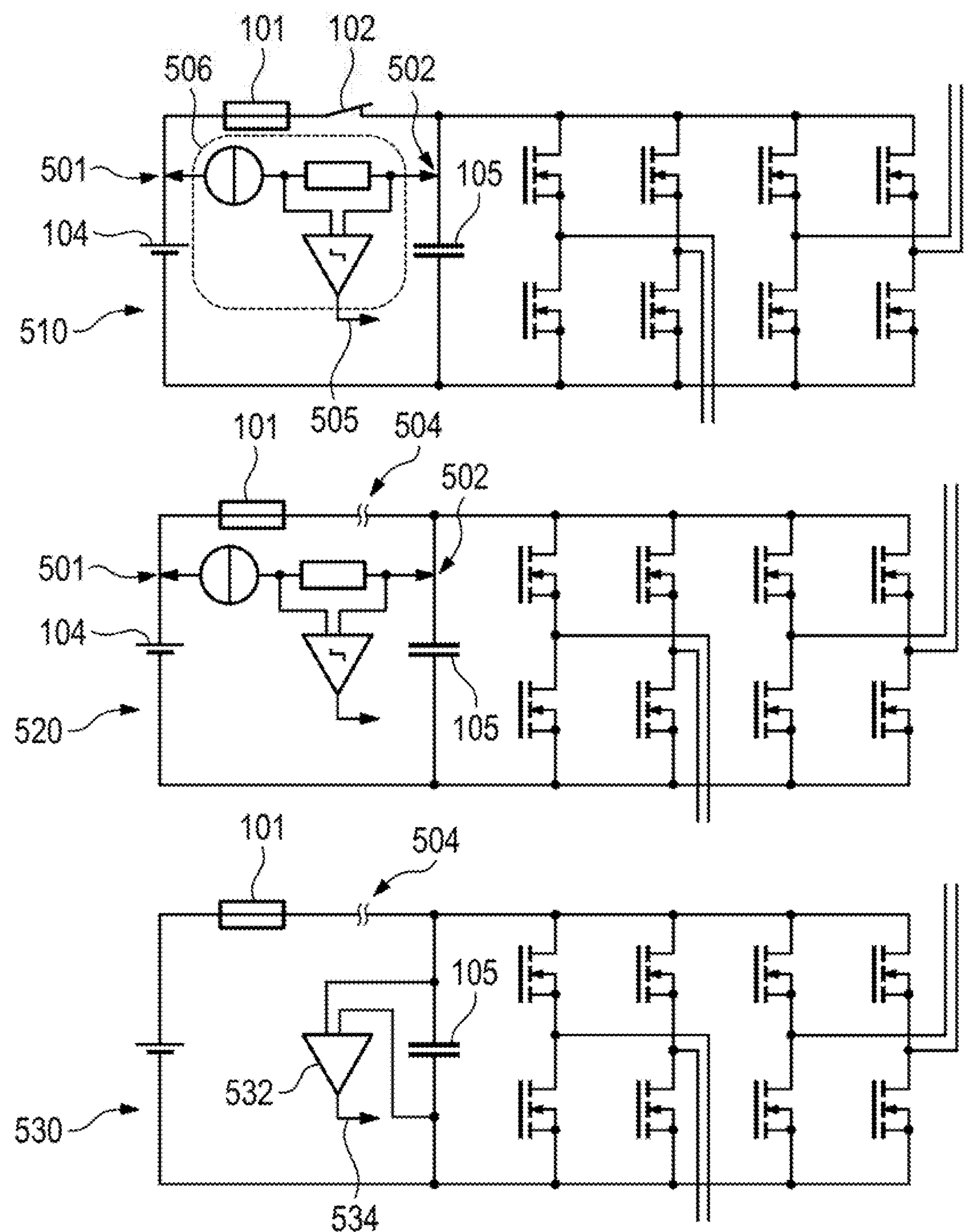
FIG. 5 shows embodiments of the circuits according to aspects of the invention with detection of an interruption to the supply of power to the power section.

FIG. 5 shows circuits 510, 520 and 530 according to aspects of the invention with detection of an interruption to the supply of power to the power section. Circuit 510 shows a measurement circuit 506 inserted between test contacts 501 and 502, around the first fuse 101, which can be used to detect the interruption to the supply of power, for example a tripped first fuse 101 or an open contactor 102, by means of a signal 505 routed to the module control (not shown here), for example. The test contacts 501 and 502 have in this instance been arranged at a positive pole of the energy storage cell 104 and at the module storage element 105, respectively. In general, they should be arranged as independently as possible of a connection to the power section of the module. In circuit 520, the same arrangement of the test contacts as in circuit 510 makes it possible to detect the case of a break 504 in the first connection to the power section of the module. Finally, in circuit 530, the break 504 in the first connection between the power section and the energy storage cell is detected by voltage monitoring 532 at the module storage element 105, preferably at the terminals of a capacitor to be added, and by means of reporting by a signal 534 routed to the module controller (not shown here). As soon as the connection between the energy storage cell and the power section breaks, a remaining DC link capacitance must handle a load current and deliver or absorb a necessary charge if a load current continues to flow. If the load current is currently flowing into the module at the time of the interruption to the supply of power, in order to charge a connected energy storage cell, a broken connection results in there being the prospect of a voltage rise above a limit that can be expected. If the load current is currently flowing out of the module and in so doing discharging the connected energy storage cell, a broken connection can result in there being the prospect of a drop in voltage below a limit that can be expected. One or two threshold switches (upper and/or lower limit) can therefore detect the breaking of a connection to the energy storage cell or a defect in the energy storage cell. No analog-to-digital converter is necessary if the detection is implemented by means of a hardware threshold switch. The thresholds can be chosen to be distinctly above the maximum or below the minimum voltage of the energy storage cell, for example. The threshold value switches can have a hysteresis in comparison with fault detection or oscillation of an output signal.

What is claimed is:

1. A circuit for protecting energy storage cells, said circuit comprising:

at least one energy storage cell, which is part of an AC battery;

at least one module of the AC battery, wherein the at least one module comprises at least one half-bridge including two power semiconductor switches, a module storage element and a module controller;

a first connection between the at least one module and the at least one energy storage cell, wherein the first connection includes a first fuse that is configured to interrupt the first connection; and a second connection between the module controller of the at least one module and the at least one energy storage cell.

2. The circuit as claimed in claim 1, in which the second connection between the module controller and the energy storage cell has a second fuse.

3. The circuit as claimed in claim 2, in which the second fuse is a fusible link or a resettable fuse.

4. The circuit as claimed in claim 1, in which the first connection between the at least one module, and the at least one energy storage cell additionally includes a contactor.

5. The circuit as claimed in claim 1, in which the second connection between the module controller of the at least one module and the at least one energy storage cell includes a quiescent circuit.

6. The circuit as claimed in claim 5, in which the quiescent circuit has a switch that is DC isolated from the circuit.

7. The circuit as claimed in claim 6, in which the switch DC isolated from the circuit is either an optocoupler or a phototransistor.

8. The circuit as claimed in claim 1, in which the second connection additionally includes a DC voltage transformer.

9. The circuit as claimed in claim 1, in which the module controller of the at least one module is configured to monitor the power semiconductor switches.

10. The circuit as claimed in claim 1, in which the module controller of the at least one module is configured to monitor opening of the first fuse.

11. The circuit as claimed in claim 10, in which the module controller of the at least one module is configured to detect opening of the first fuse by way of test points that are disposed upstream and downstream of the first fuse.

12. The circuit as claimed in claim 1, further comprising a capacitor arranged in the first connection between the first fuse with an optional contactor and upstream of a power section comprising the power semiconductor switches.

* * * * *